United States Patent
Saeijs et al.

[11] Patent Number: 6,122,123
[45] Date of Patent: Sep. 19, 2000

[54] METHOD AND APPARATUS FOR RECORDING DIGITAL INFORMATION SIGNALS IN WHICH, IN ORDER TO PRESERVE TIMING, EACH PACKET IS CHECKED FOR THE PRESENCE OF PROGRAM CLOCK REFERENCE SIGNAL

[75] Inventors: Ronald W. J. J. Saeijs, Eindhoven, Netherlands; Makoto Asano, Vienna, Austria

[73] Assignee: U.S. Philips Corporation, New York, N.Y.

[21] Appl. No.: 09/035,429

[22] Filed: Mar. 5, 1998

[30] Foreign Application Priority Data

Mar. 12, 1997 [EP] European Pat. Off. .............. 97200737

[51] Int. Cl.$^7$ ....................................................... G11B 5/09
[52] U.S. Cl. ................................................................ 360/51
[58] Field of Search ................................. 360/48, 51, 27; 348/467

[56] References Cited

U.S. PATENT DOCUMENTS 5,517,250  5/1996  Hoogenboom et al. ................. 348/467
5,579,183  11/1996  Van Gestel et al. ........................ 360/48
5,596,581  1/1997  Saeijs et al. .............................. 370/394

OTHER PUBLICATIONS

"International Organisation for Standardisation, Generic Coding of Moving Pictures and Associated Audio: Systems", ISO/IEC 13818-1, Nov. 13, 1994, pp. i-xix; 1-141.

*Primary Examiner*—W. Chris Kim
*Attorney, Agent, or Firm*—Edward W. Goodman

[57] ABSTRACT

A program is selected from a plurality of programs in an MPEG transport stream for recording on a record carrier. The presence of a program clock reference (PCR) value in a packet in the stream is detected. The packet identifier for the packet is retrieved and stored. Clock reference signals of subsequent packets with a packet identifier equal to the stored packet identifier, are retrieved. The program clock references are used to synchronize a clock counter. Each recorded packet is time stamped according to the clock counter. If clock reference signal is not received within 100 ms, then a packet with a PCR value with a different packet identifier is retrieved and the stored packet identified is replaced by the different packet identifier.

11 Claims, 4 Drawing Sheets

METHOD AND APPARATUS FOR RECORDING DIGITAL INFORMATION SIGNALS IN WHICH, IN ORDER TO PRESERVE TIMING, EACH PACKET IS CHECKED FOR THE PRESENCE OF PROGRAM CLOCK REFERENCE SIGNAL

BACKGROUND OF THE INVENTION

1. Field of the Invention

The invention relates to an apparatus for recording a digital information signal on a record carrier, the digital information signal comprising a serial datastream of information packets, the information packets comprising a packet identifier and portions of information of one or more programs, packets having the same packet identifier belonging to the same program, the apparatus comprising:

(a) input means for receiving the digital information signal, (b) signal processing means for processing the digital information signal into a recording signal suitable for recording on the record carrier, and (c) writing means for writing the recording signal on the record carrier. The invention also relates to a method for recording the digital information signal.

2. Description of the Related Art

An apparatus as defined in the opening paragraph is disclosed in International Patent Application WO 96/30.905, corresponding to U.S. Pat. No. 5,953,483, Document D1 in the List Of Related Documents that can be found at the end of this description.

The digital information signal may be in the form of an MPEG transport stream, comprising packets that may occur irregularly in the transport stream.

The ISO/IEC 13.818-1 international standard, part 1, 'Systems', Document D5 in the List Of Related Documents, includes a description of the transport stream, for transmitting a plurality of programs, for broadcasting purposes or for transmission via a cable network. Each program comprises one or more data compressed digital video signals and one or more corresponding data compressed audio signals. The transport packets in the transport stream comprise 188 bytes of information each.

Packets in the MPEG serial data stream comprise, apart from 'system information', one kind of information, that is: either a portion of a video signal, or a portion of an audio signal or a portion of a data signal. A packet comprises information of only one of the video signals, or one of the audio signals or one of the data signals transmitted via the MPEG serial data stream.

A transmission of such an MPEG information signal in the form of a recording on and a reproduction from a record carrier, requires special measures to be taken in order to realize such kind of transmission.

International Patent Application WO 96/30.905, Document D1, International Patent Application WO 95/27.978, corresponding to U.S. Pat. No. 6,008,959 (PHN 14.818), Document D3, and Internation Patent Application WO 95/27977, corresponding to U.S. Pat. No. 5,596,581 (PHA 21.886), Document D4 in the List Of Related Documents, describe various of such measures to realize a recording and reproduction of an MPEG information signal.

It can generally be said that the recording of a complete MPEG information signal is not well possible, because of the too high data-rate of the MPEG information signal, compared to the bandwidth of the recording medium. Therefore, the above Documents D1, D3 and D4 disclose the selection of one program, that is, one video signal and its corresponding audio signal(s), from the MPEG serial datastream for recording. As a consequence, generally, transport packets will be selected on an irregular basis as a function of time. In order to preserve the timing relation between the subsequent packets selected, after having recorded and reproduced the packets, the earlier filed Documents describe the measure of inserting timing information (or a 'time stamp') in each of the packets recorded. Upon reproduction, the timing relation between the subsequent packets can be regained using the time stamps.

More specifically, Document D1 disclose the generation of the time stamps in response to clock reference signals retrieved from packets in the serial datastream. These clock reference signals, defined as 'program clock reference' (PCR) in the above ISO/IEC standard, Document D5, occur (generally irregularly) in the MPEG datastream, are retrieved from the datastream and compared with the count value of a counter that is clocked by a 27 MHz clock contained in the recording apparatus, so as to synchronize the counter, by controlling the clock frequency of the 27 MHz clock. The clock further clocks a second counter which generates the time stamps for combining to a corresponding packet.

SUMMARY OF THE INVENTION

The invention aims at providing a recording apparatus for recording a plurality of programs, each program comprising a video signal with its corresponding audio signal(s).

In accordance with the invention, the recording apparatus as defined in the opening paragraph, is characterized in that the retrieval means are adapted to (d) detect the presence of a clock reference signal in the packets in the serial datastream of information packets, (e) retrieve the packet identifier from the first packet in which a clock reference signal has been detected and store the packet identifier retrieved from that packet in a memory, (f) subsequently retrieve clock reference signals from those packets having a packet identifier which equals the packet identifier stored in the memory, (g) monitor the time interval since the last occurrence of a clock reference signal in/from those packets having a packet identifier which equals the packet identifier stored in the memory, and (h) return to step (d) upon the said time interval exceeding a predetermined time interval.

The invention is based on the recognition that, for recording one program, comprising a video signal and its corresponding audio signal(s), the packets comprising information corresponding to this video signal and its corresponding audio signal(s) can be found via the program allocation table (PAT) included in the datastream. The program allocation table is included in packets in the MPEG transport stream. The packets have a packet identifier (PID) having a specific value (PID=0). The program allocation table comprises, for each program included in the transport stream, a pointing vector to packets having a specific PID value. These packets comprise the program map table (PMT) for the program. The program map table comprises, among others, the values of the packet identifier of those packets that comprise the program clock reference signals for the program. In this relatively complicated way, the program clock reference signals can be located in the MPEG datastream and retrieved therefrom.

In accordance with the invention, for recording a plurality of programs, a simpler way of detecting the program clock reference signals is carried out, namely, by not using the program allocation table and the program map table, but simply by checking every packet that passes by for the presence of a program clock reference signal. One of the program clock reference signals of the programs selected for recording will be chosen, namely, that cone program clock reference signal that has been detected first. As a result, the program clock reference chosen for generating the time stamps during recording of the programs is an arbitrary one of the program clock references corresponding to the programs selected for recording.

BRIEF DESCRIPTION OF THE DRAWINGS

These and other aspects of the invention will be apparent from and further elucidated with reference to the accompanying drawings, in which.

DESCRIPTION OF THE PREFERRED EMBODIMENTS

Figure 1:
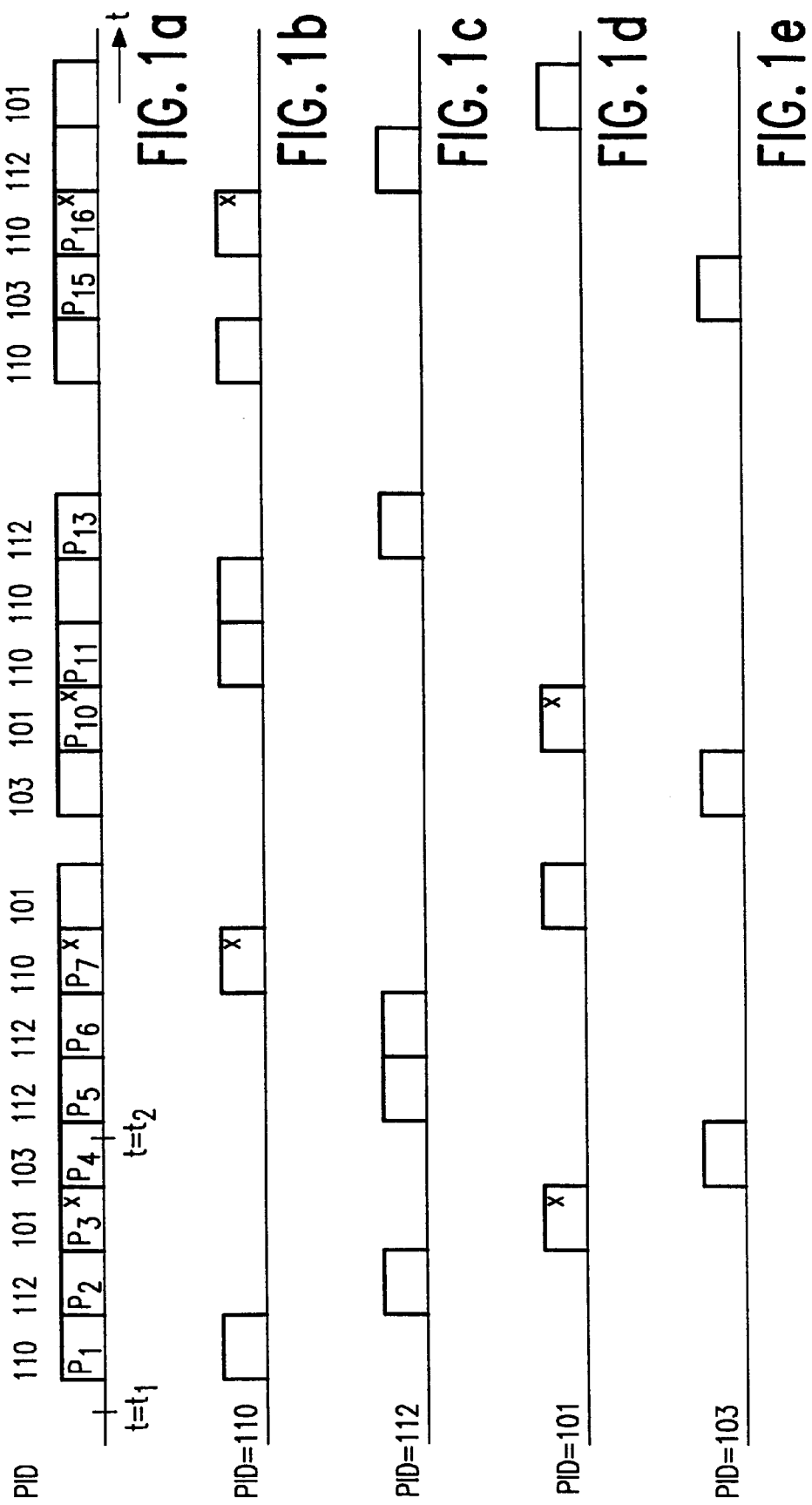
FIGS. 1a–1e show the information signal to be recorded as a function of time, comprising packets that occur irregularly as a function of time.
Figure 2:
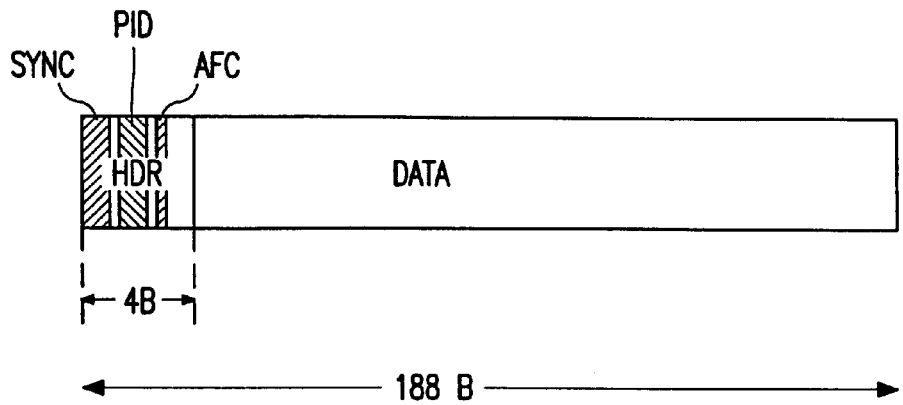
FIG. 2 shows the contents of a packet in the MPEG datastream.
Figure 3:
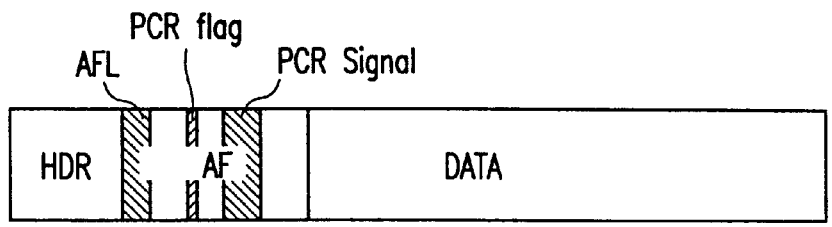
FIG. 3 shows the content of another packet, comprising an adaptation field and a PCR signal in the adaptation field.

FIGS. 1a–1e show, schematically, the serial datastream of an MPEG encoded digital transport stream, selected for recording on the record carrier, and FIG. 2 shows, schematically, the contents of a packet comprised in the serial datastream. The packets comprise 188 bytes of information each. Each packet comprises a header portion, denoted 'HDR', of 4 bytes long and a datafield, denoted 'DATA', which is 184 bytes long, for storing a portion of information of the digital video signal or the digital audio signal, or for storing data. A packet comprises information of one kind of signal, either a video signal, or an audio signal, or a data signal. A sync word, denoted 'SYNC', and a packet identifier number (PID) are included in the headers of the packets, see FIG. 2. The packet identifers (PID) identify the kind of information included in a packet. Packets having the same PID comprise the same information stream. The header portion HDR further comprises a 2-bit adaptation field control word, denoted 'AFC'. When the value of the AFC equals '01', the packet is as shown in FIG. 2. When the value of AFC equals '11', the packet is in the form as shown in FIG. 3. The 184-byte long datafield of FIG. 2 is now subdivided into a first portion, denoted 'AF', the so-called adaptation field, and the remaining portion, again denoted 'DATA', is for storing a portion of information of the digital video signal or the digital audio signal, or for storing data. When the value of AFC equals '10', there is only an adaptation field and the datafield is absent in the packet.

The length of the adaptation field can be variable. Therefore, the adaptation field comprises a word AFL, indicating the adaptation field length. The adaptation field length word AFL is the first byte in the adaptation field. Further, the adaptation field AF comprises a flag, denoted 'PCR flag' (program clock reference flag), at a specific fixed position in the adaptation field. The PCR flag is a 1-bit word, where the value '0' means that no program clock reference signal is present in the adaptation field, and the value '1' means that a program clock reference signal is present in the adaptation field. If PCR flag='1', a 42-bit long program clock reference signal, denoted 'PCR signal' in FIG. 3, is present at a specific fixed location in the adaptation field portion of the packet.

The datastream shown in FIG. 1a as a function of time, is the datastream comprising only those (one or more) programs that have been selected from an incoming MPEG transport stream, for recording in the recording apparatus to be described later on the record carrier. The datastream comprises packets $P_1$, $P_2$, $P_3$, . . . . The PID values for the packets are given in FIG. 1a, above the packets in question. As can be seen, the packet $P_1$ has a PID value of 110, the packet $P_2$ has a PID value of 112, the packet $P_3$ has a PID value of 101, and so on.

FIGS. 1b–1e show the datastreams of the various programs comprised in the datastream in FIG. 1a. In the present example, two programs are present, each having two datastreams. The first program is the program comprising the datastreams of packets having PID values 110 and 112, and the second program comprises the datastreams of packets having PID values 101 and 103. The datastream of packets having a PID value equal to 110 can be a datastream of a video signal. The datastream of packets having the PID value equal to 112, can be the datastream of the corresponding audio signal. The datastream of packets having a PID value equal to 101, can be a datastream of a video signal. The datastream of packets having the PID value equal to 103, can be the datastream of the corresponding audio signal. The datastreams of the video signals have their own program clock reference signals stored, generally irregularly, in some of the packets in the respective datastreams.

In FIG. 1a, those packets comprising a program clock reference signal are indicated by an 'x'. Thus, the packets $P_3$ and $P_{10}$ comprise a PCR signal for the program denoted by PID=101, and the packets $P_7$ and $P_{16}$ comprise a PCR signal for the program denoted by PID=110.

Figure 4:
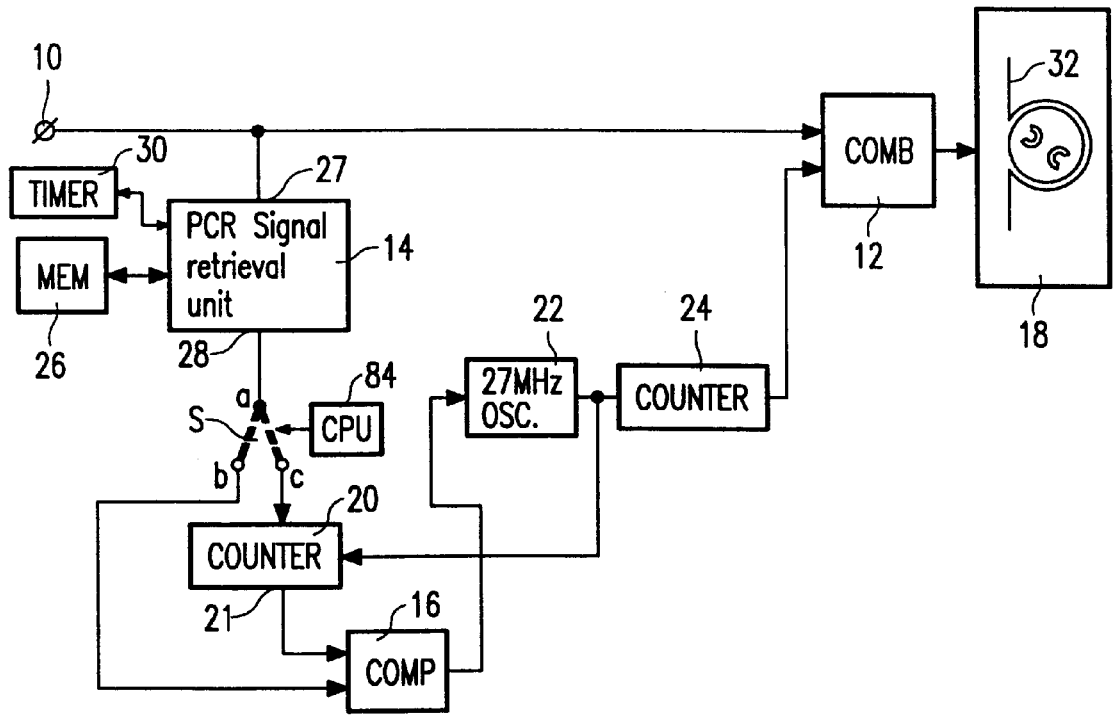
FIG. 4 shows a schematic embodiment of the recording apparatus.

FIG. 4 shows a schematic embodiment of the recording apparatus. The apparatus comprises an input terminal 10 for receiving the datastream shown in FIG. 1a. The input terminal is coupled to a first input of a signal combination unit 12 and to an input of a retrieval unit 14. The retrieval unit 14 is adapted to retrieve the PCR signals from the packets of the serial datastream shown in FIG. 1a. The PCR signals retrieved are supplied to a terminal denoted 'a' of a controllable switch S, via its output 28. A memory 26 is available and coupled to the retrieval unit 14, for storing a PID value. Further, a timer 30 is available for cooperating with the retrieval unit 14, as will be made clear hereafter.

A terminal 'c' of the switch S is coupled to an input of a counter 20. A 42-bit wide output 21 of the counter 20 is coupled to a first input of a comparator 16. The 'b' terminal of the switch S is coupled to a second input of the comparator 16. An output of the comparator 16 is coupled to a control input of a controllable oscillator 22, which preferably runs at a 27 MHz frequency on the average. The output of the oscillator 22 is coupled to clock inputs of the counters 20 and 24. The counter 24 has a 22-bit wide output which is coupled to a second input of the signal combination unit 12. An output of the signal combination unit 12 is coupled to an input of a write unit 18. The write unit 18 is well known in the art and needs no further explanation. The counter generates the time stamps for the packets, these time stamps being combined with their corresponding packets in the signal combination unit 12. Further, a central processing unit 84 is present for controlling, among others, the position of the switch S.

A further description of the retrieval of the PCR signals in the retrieval unit 14 will now be given. The retrieval unit 14 looks for the presence of the AFC word in the header portion HDR of the packets. If the retrieval unit 14 detects a packet having an AFC word equal to '10' or '11', it knows that an adaptation field is present in the said packet. The retrieval unit 14 subsequently looks for the value of the PCR flag in the adaptation field. If the PCR flag has a value '1', it knows that a PCR signal is present in the adaptation field AF. Subsequently, the retrieval unit 14 retrieves not only the PCR signal from the packet for supplying the PCR signal to its output 28, but also retrieves the PID value in the header portion of the packet and stores the PID value in the memory 26. During this step in the process, the switch S is switched into its position a-c. Therefore, the PCR signal retrieved is supplied to the counter 20 and stored therein so as to set the counter to a count value equal to the PCR value.

Next, the retrieval unit 14 switches into a mode in which the search for PCR signals is restricted to only the packets having a PID value that is equal to the PID value stored in the memory 26. In this mode, the switch S is switched into its position a-b. When such a packet is found, and the packet further comprises a PCR value, this value is retrieved from the packet and supplied, via the retrieval unit output 28, to the comparator 16. The comparator 16 compares the PCR value with the count value supplied by the counter 21, and generates a control signal in response to the difference between both values. The control signal controls the oscillator 22 by either slowing it down or speeding it up, so as to bring the PCR values, supplied to the second input of the comparator 16, into agreement with the count values supplied by the counter 20 to the first input of the comparator 16.

The timer 30 measures the length of the time interval. since the last occurrence of a PCR value detected by the retrieval unit 14. When the time interval measured by the timer 30 exceeds a specific predetermined time interval, the retrieval unit 14 is switched into its original detection mode, in which all the packets are checked for the presence of a PCR value, and the switch S is switched into its position a-c.

Going back to Figures 1a-1e, suppose that recording is started at an instant $t=t_1$. The retrieval unit 14 looks for the presence of a PCR value in the packet $P_1$ and finds no PCR value. Next, the retrieval unit 14 checks the packet $P_2$ for the presence of a PCR value. Again, it finds no such PCR value. Next, the retrieval unit 14 finds a PCR value in the packet $P_3$. The PID value, which equals 101, is stored in the memory 26. Further, the PCR value is outputted at the retrieval unit output 28 and, as the switch S is in its position a-c, the PCR value is supplied to the counter 20 so as to set the count value of the counter 20 to a count value corresponding to the PCR value.

The retrieval unit 14 does not retrieve the PCR value in the packet $P_7$, as the PID number is not the same as the PID stored in the memory 26. Upon receiving the packet $P_{10}$ at the input 10, the retrieval unit 14 detects a PID number which is equal to the PID number stored in the memory 26, and subsequently retrieves the PCR signal stored in the packet and supplies the PCR signal to its output 28. As the switch S is in its position a-b, the comparator 16 compares the PCR value just retrieved with the count value supplied by the counter 20 and generates a control signal so as to control the frequency of the oscillator 22.

As a result, recording of the various datastreams, corresponding to the PID numbers 101, 103, 110 and 112, is realized using time stamps generated on the basis of the PCR signals retrieved from the datastream having the PID number 101.

Suppose now, that recording is started at a time instant $t=t_2$. The retrieval unit 14 looks for the presence of a PCR value in the packet P5 and finds no PCR value. Next, the retrieval unit 14 checks the packet $P_6$ for the presence of a PCR value. It finds no PCR value in the packet $P_6$. Next, the retrieval unit 14 detects a PCR value in the packet $P_7$. The PID value, which equals 110, is stored in the memory 26 and the PCR value is outputted at the retrieval unit output 28 and supplied to the counter 20 via the switch S, so as to set the count value in the counter 20 to a count value corresponding to the PCR value detected. The retrieval unit 14 does not retrieve the PCR value in the packet $P_{10}$, as the PID number of this packet is not the same as the PID stored in the memory 26. Upon receiving the packet $P_{16}$ at the input 10, the retrieval unit 14 detects a PID number which is equal to the PID number stored in the memory 26 and subsequently retrieves the PCR signal stored in the packet and supplies the PCR signal to its output 28. The PCR value is supplied to the second input of the comparator 16 and compared therein with the count value of the counter 20. The control signal generated by the comparator 20 in response thereto is used to control the frequency of the oscillator 22.

As a result, recording of the various datastreams, corresponding to the PID numbers 101, 103, 110 and 112, is realized using time stamps generated on the basis of the PCR signals retrieved from the datastream having the PID number 110.

It should thus be concluded that, dependent of the time instant on which recording is started, that datastream is selected for retrieving the PCR signals, that, as the first, comprise a PCR signal in its datastream.

It further may occur that a program is terminated and is not included anymore in the transport stream supplied to the input terminal 10. If this program comprised the datastream from which the PCR values were retrieved, synchronization is lost a certain time after the termination of the program in the transport stream. Therefore, the timer 30 is available. The timer 30 measures the time interval since the last occurrence of a PCR signals in the program that is used for deriving the PCR signals. If the time interval exceeds a predetermined time interval, the apparatus is switched into the original mode in which all the packets in the transport stream are searched for the presence of a PCR signal.

Figure 5:
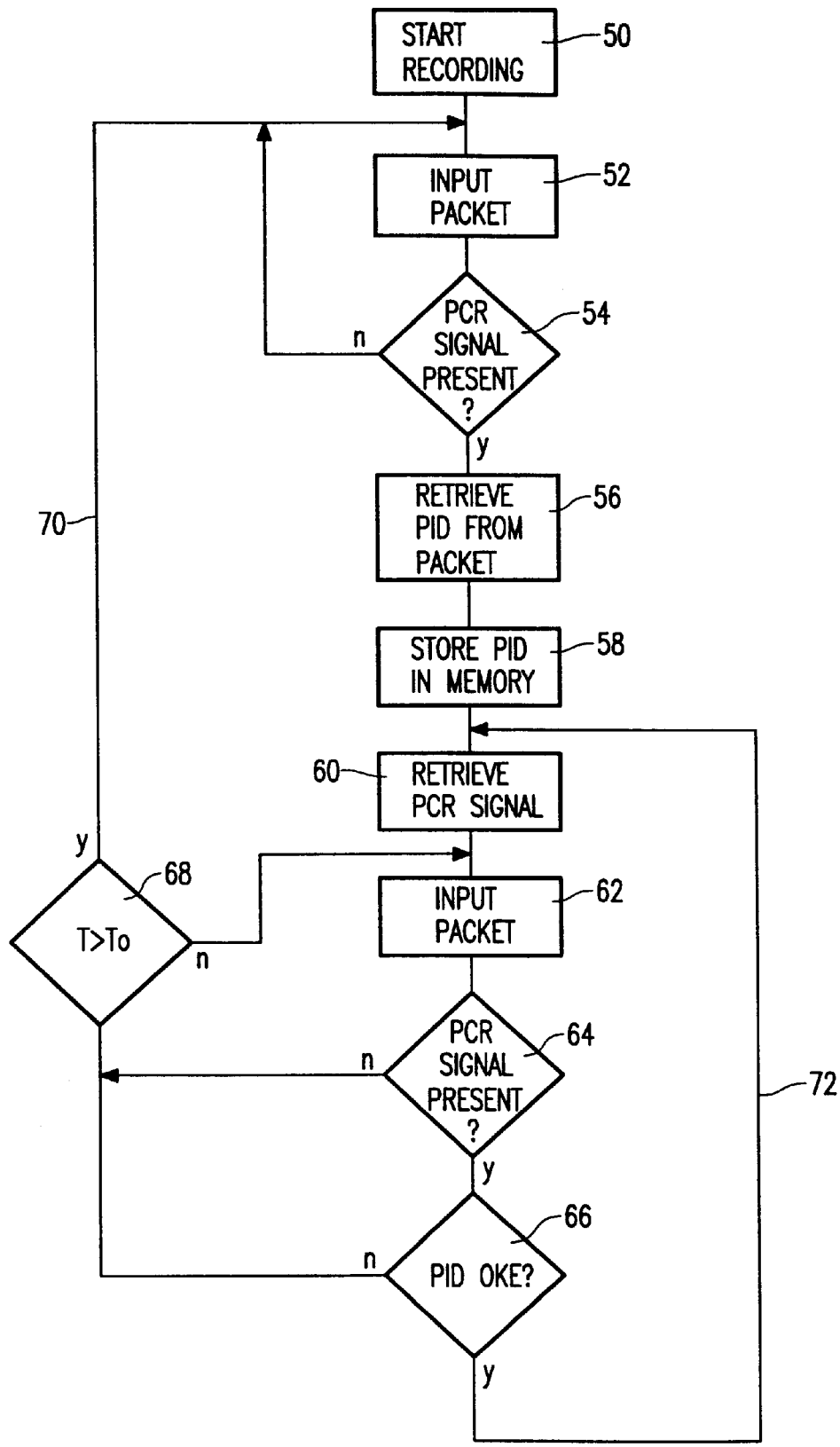
FIG. 5 shows a flowchart of the method for retrieving the PCR values.

FIG. 5 shows a flowchart of the method of detecting a PCR signal. In block 50, the recording of the transport stream shown in FIG. 1a is started. A packet is inputted in the retrieval unit 14, block 52 in FIG. 5. The retrieval unit 14 looks for the presence of a PCR signal in the packet, and if not, the program returns to block 52, by inputting the next packet. If so, see block 54, the PID value comprised in the packet is retrieved, block 56, and stored in the memory 26, block 58. Further, the PCR value is retrieved from the packet, block 60. The next packet is inputted, block 62. If a PCR signal is present in the packet, see block 64, and the PID of the packet equals the PID value stored in the memory, see block 66, the PCR signal is retrieved from the packet, see block 60. If no PCR value is present in the packet, see block 64, or if the PID value is not the same as the PID value stored in the memory 26, the program returns to block 68.

If the time interval T since the last occurrence of a valid PCR signal exceeds a predetermined time interval $T_0$, see block 68, it is assumed that the program from which the PCR signals are retrieved is absent from the transport stream, so that the program returns to the original mode, via the path 70, to the loop including the blocks 52 and 54, in which all the packets are searched for the presence of a PCR value. If not, the program continues from block 68 to block 62, by inputting the next packet.

Figure 6:
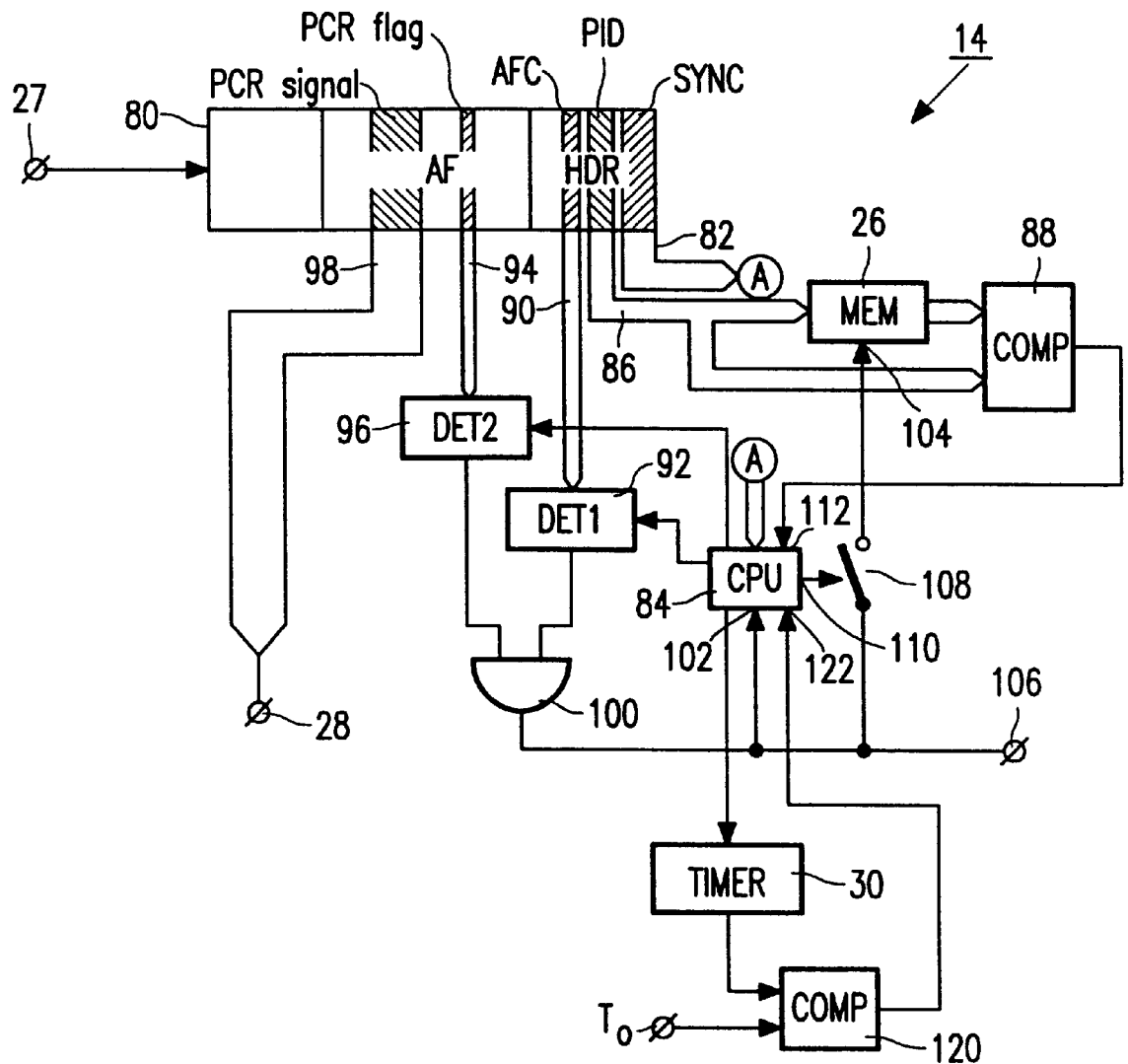
FIG. 6 shows a more elaborated embodiment of the retrieval unit in the recording apparatus.

FIG. 6 shows a more elaborated version of the retrieval unit 14 in the recording apparatus. The retrieval unit 14 comprises a memory 80, having an input coupled to the input 27 of the retrieval unit 14. The memory is in the form of a shift register in which at least the head portion of a packet can be stored, in FIG. 6 in the reverse order compared to the order of the packet shown in FIGS. 2 and 3. Various parallel outputs of the memory 80 are available. The last 8 storage positions in the memory can form a first output 82, which may be coupled to an input of a central processor unit CPU 84. A second output of the memory 80 is the output 86, which is coupled to corresponding inputs of a comparator 88 and the memory 26. An output of the memory 26 is coupled to a second input of the comparator 88. A third output 90 of the memory 80 is coupled to an input of a first detector 92. A fourth output 94 is coupled to an input of a second detector 96. Again, another output 98 of the memory 80 is coupled to the output 28 of the retrieval unit 14.

Outputs of the detectors 92 and 96 are coupled to corresponding inputs of an AND circuit 100, which has an output coupled to control inputs 102 and 104 of the CPU 84 and the memory 26, respectively, and to an output 106. A switch 108, which is controlled by a control signal from the CPU 84, is included in the connection between the output of the AND circuit 100 and the control input 104 of the memory 26. An output of the comparator 88 is coupled to an input 112 of the CPU 84. Further, the timer 30 is coupled to the CPU 84. The timer output is coupled to one input of a comparator 120, which receives a value corresponding to the predetermined time interval T at a second input. The time interval T could be chosen equal to 100 ms. An output of the comparator 120 is coupled to a control input 122 of the CPU.

The functioning of this retrieval unit is as follows. Upon starting recording, the CPU is instructed to generate a control signal at its output 110 to supply a control signal to the switch 108 so that it closes. When the head portion of the first packet that is received via the input 27 is completely shifted into the memory 80, such that the sync word is stored in the last 8 bit positions in the memory 80, the CPU 84 can detect the byte stored in the 8 bit positions as being equal to the sync word. If so, this means that at the output 86 of the memory 80, the PID value of the packet is available and that at the output 90, the AFC word is available. If the packet comprises an adaptation field, this further means that at the output 94 of the memory 80, the PCR flag is available and that, if the flag equals '1', the PCR signal is available at the output 98.

Upon detecting the sync word at the output 82, the CPU instructs the detector 92 to check whether the AFC word equals 10 or '11'. If so, this means that an adaptation field is present in the packet, and the detector 92 generates a control signal at its output. Further, the CPU instructs the detector 96 to check whether the PCR flag equals '1'. If so, this means that the adaptation field comprise a PCR signal, and the detector 96 generates a control signal at its output. Upon receiving control signals at both inputs, the AND circuit 100 generates a control signal at its output. Upon receipt of the control signal, the memory 26 stores the PID value, applied to its input, in the memory. Further, in response to the control signal, the CPU generates a control signal at its output 110 so as to open the switch 108. Further, via the output 106 which is coupled to control switch S, the counter 20 can be controlled so as to accept the PCR signal present at the output 28 of the retrieval unit 14, and supplied to the counter 20 via the switch S, see FIG. 4.

Upon the receipt of the next packet and the storage of the header portion of this packet in the memory 80, the PID value stored in this packet and supplied to the comparator 88, is compared to the PID value stored in the memory 26. Upon disagreement, the comparator supplies a control signal to the input 112 of the CPU 84, and, in response thereto, the CPU disables the detectors 92 and 96. Upon agreement between the two PID values, the comparator 88 generates another control signal, which is supplied to the CPU. In response thereto, the CPU enables the detectors 92 and 96, so that they can generate a control signal if the AFC word equals '10' or '11' and the PCR flag equals '1'. If both control signals occur, the AND circuit 100 again generates a control signal which is supplied to the output 106, so that the PCR signal present at the output 28, can be supplied to the second input of the comparator 16, in response to this control signal, see FIG. 4.

In response to the detection of a PCR value, the timer 30 is, each time, restarted and measures the time since the last occurrence of a PCR value in the packets having a PID equal to the PID stored in the memory 26. If the time interval measured in the timer 30 exceeds the time interval $T_0$, the comparator 120 generates a control signal at its output. In response to this control signal, the CPU again closes the switch, and the search for the next PCR value starts again, as explained above.

While the invention has been described with reference to preferred embodiments thereof, it is to be understood that these are not limitative examples. Thus, various modifications may become apparent to those skilled in the art, without departing from the scope of the invention, as defined by the claims. As an example, the invention has been described with reference to the generation of time stamps. The choice and detection of the PCR values could, however, be used for other purposes, such as for locking a tape servo system to the PCR values in the transport stream.

Further, the invention lies in each and every novel feature or combination of features.

RELATED DOCUMENTS (D1) WO 96/30.905, which corresponds to U.S. Pat. No. 5,953,483 (PHN 15.260)
(D2) WO 97/2562, which corresponds to U.S. Pat. No. 6,008,959 (PHN 15.368)
(D3) WO 95/27.978, which corresponds to U.S. Pat. No. 5,579,183 (PHN 14.818)
(D4) WO 95/27977, which corresponds to U.S. Pat. No. 5,596,581 (PHA 21.886),
(D5) ISO/IEC 13.818-1, International standard on Information technology—Generic coding of moving pictures and associated audio: Systems.

What is claimed is:

1. An apparatus for recording a digital information signal on a record carrier, the digital information signal including a serial datastream of information packets, the information packets including a packet identifier and portions of information of a program of one or more programs in the data stream, packets having the same packet identifier belonging to the same program, the apparatus comprising:

(a) retrieval means for receiving the digital information signal;

(b) signal processing means for processing the digital information signal into a recording signal suitable for recording on the record carrier; and (c) writing means for writing the recording signal on the record carrier, in which the retrieval means comprises:

(d) means for detecting the presence of a clock reference signal in all of the packets in the serial datastream of information packets;

(e) storage means for retrieving the packet identifier from the first packet in which a clock reference signal has been detected, and for storing the packet identifier retrieved from that packet;

(f) means for subsequently retrieving clock reference signals from those packets in the datastream having a packet identifier which equals the packet identifier stored in the storage means;

(g) means for monitoring the time interval since the last occurrence of a clock reference signal in those packets having a packet identifier which equals the packet identifier stored in the storage means; and (h) means for initiating the storage means after the time interval exceeds a predetermined time interval to replace the packet identifier stored in the storage means.

2. The apparatus as claimed in claim 1, wherein the signal processing means includes:

(i) clock retrieval means for retrieving clock reference signals from packets in the serial datastream;

(ii) time stamp generator means for generating time stamps for each of the packets, in response to the retrieved clock reference signals; and (iii) signal combining means for combining a time stamp and its corresponding packet.

3. The apparatus as claimed in claim 1, wherein the digital information signal is an MPEG transport stream.

4. The apparatus as claimed in claim 2, in which the packets include a header portion and a data portion, the header portion including an indicator signal indicating the presence of a clock reference signal in the data portion of the packet, wherein the retrieval means comprises detection means for detecting the indicator signal and for generating a control signal upon detection of the indicator signal, the retrieval means retrieving the clock reference signal from the data portion of the packet in response to the control signal.

5. The apparatus as claimed in claim 1, wherein the monitoring means comprises a timer for measuring the time interval since the last occurrence of a clock reference signal in packets having a packet identifier which equals the packet identifier stored in the storage means.

6. The apparatus as claimed in claim 5, wherein the retrieval means comprises comparator means for comparing the time interval with said predetermined time interval and for generating a second control signal upon the time interval exceeding the predetermined time interval, the retrieval means further initiating the storage means, in response to the occurrence of the second control signal, to replace the packet identifier stored in the storage means.

7. The apparatus as claimed in claim 1, wherein the predetermined time interval is 100 ms.

8. A method of recording a digital information signal on a record carrier, the digital information signal including a serial datastream of information packets, the information packets including a packet identifier and portions of information of a program of one or more programs in the datastream, packets having the same packet identifier belonging to the same program, the method comprising the steps:

(a) retrieving the digital information signal;

(b) processing the digital information signal into a recording signal suitable for recording on the record carrier; and (c) writing the recording signal on the record carrier, wherein the retrieval step comprises the substeps:

(d) detecting the presence of a clock reference signal in the packets in the serial datastream of information packets;

(e) retrieving the packet identifier from the first packet in which a clock reference signal has been detected and storing the packet identifier retrieved from that packet in a memory;

(f) subsequently retrieving clock reference signals from those packets having a packet identifier which equals the packet identifier stored in the memory;

(g) monitoring the time interval since the last occurrence of a clock reference signal in/from those packets having a packet identifier which equals the packet identifier stored in the memory; and (h) returning to substep (d) upon the time interval exceeding a predetermined time interval.

9. The apparatus as claimed in claim 1, wherein the signal processing means comprises:

(i) clock retrieval means for retrieving clock reference signals from packets in the serial datastream;

(ii) time stamp generator means for generating time stamps for each of the packets, in response to the retrieved clock reference signals; and (iii) signal combining means for combining a time stamp and its corresponding packet, wherein the digital information signal is an MPEG transport stream, the packets include a header portion and a data portion, the header portion including an indicator signal indicating the presence of a clock reference signal in the data portion of the packet, wherein the retrieval means comprises:

detection means for detecting the indicator signal and for generating a control signal upon detection of the indicator signal, the retrieval means retrieving the clock reference signal from the data portion of the packet in response to the control signal;

the monitoring means comprising a timer for measuring the time interval since the last occurrence of a clock reference signal in packets having a packet identifier which equals the packet identifier stored in the memory; and comparator means for comparing the time interval with said predetermined time interval and for generating a second control signal upon the time interval exceeding the predetermined time interval, the retrieval means initiating the storage means, in response to the occurrence of the second control signal, to replace the packet identifier stored in memory, and wherein said predetermined time interval is 100 ms.

10. The method as claimed in claim 8, wherein the signal processing step comprises the substeps:

(i) retrieving clock reference signals from packets in the serial datastream;

(ii) generating time stamps for each of the packets, in response to the clock reference signals; and (iii) combining a time stamp and its corresponding packet, wherein the digital information signal is an MPEG transport stream, the packets include a header portion and a data portion, the header portion including an indicator signal indicating the presence of a clock reference signal in the data portion of the packet, wherein the retrieval step includes:

detecting the indicator signal and generating a control signal upon detection of the indicator signal;

retrieving the clock reference signal from the data portion of the packet in response to the control signal;

measuring the time interval since the last occurrence of a clock reference signal in packets having a packet identifier which equals the packet identifier stored in the memory;

comparing the time interval with the predetermined time interval and generating a second control signal upon the time interval exceeding the predetermined time interval; and initiating the storage means, in response to the occurrence of the second control signal, to replace the packet identifier stored in the storage means, and wherein the predetermined time interval is 100 ms.

11. An apparatus for programming a programmable recorder to record a digital information signal on a record carrier, the digital information signal including a serial datastream of information packets, the information packets comprising a packet identifier and portions of information of a program of one or more programs in the data stream, packets having the same packet identifier belonging to the same program, the apparatus comprising:

(a) retrieval means for receiving the digital information signal;

(b) signal processing means for processing the digital information signal into a recording signal suitable for recording on the record carrier; and (c) writing means for writing the recording signal on the record carrier, wherein the retrieval means comprises:

(d) means for detecting the presence of a clock reference signal in all the packets in the serial datastream of information packets;

(e) storage means for retrieving the packet identifier from the first packet in which a clock reference signal has been detected, and for storing the packet identifier retrieved from that packet;

(f) reference means for subsequently retrieving clock reference signals from those packets in the datastream having a packet identifier which equals the packet identifier stored in the storage means;

(g) means for monitoring the time interval since the last occurrence of a clock reference signal in those packets having a packet identifier which equals the packet identifier stored in the storage means; and (h) means for initiating the storage means, after the time interval exceeds a predetermined time interval, to replace the packet identifier stored in the storage means.

* * * * *